US012344009B2

(12) United States Patent
Heath et al.

(10) Patent No.: US 12,344,009 B2
(45) Date of Patent: *Jul. 1, 2025

(54) STEP COMPENSATING CARRIAGE PRINTER

(71) Applicant: ELECTRONICS FOR IMAGING, INC., Londonderry, NH (US)

(72) Inventors: Peter Heath, Alexandria, NH (US); Paul Duncanson, Franklin, NH (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,225

(22) Filed: Oct. 7, 2021

(65) Prior Publication Data

US 2022/0024231 A1 Jan. 27, 2022

Related U.S. Application Data

(63) Continuation of application No. 16/590,233, filed on Oct. 1, 2019, now Pat. No. 11,167,574.

(51) Int. Cl.
*B41J 25/00* (2006.01)
*B41J 11/00* (2006.01)

(52) U.S. Cl.
CPC ......... *B41J 25/001* (2013.01); *B41J 11/0095* (2013.01)

(58) Field of Classification Search
CPC ......... B41J 11/007; B41J 15/04; B41J 25/001
See application file for complete search history.

(56) References Cited

U.S. PATENT DOCUMENTS

| | | | | |
|---|---|---|---|---|
| 8,016,380 | B2 * | 9/2011 | Codos | B41J 15/04 347/14 |
| 8,757,757 | B2 | 6/2014 | Takeuchi | |
| 2002/0158144 | A1 * | 10/2002 | Anderson | B41J 25/001 239/227 |
| 2004/0217999 | A1 | 11/2004 | Boleda et al. | |
| 2006/0119695 | A1 * | 6/2006 | Kojima | B41J 11/007 347/164 |
| 2008/0258382 | A1 | 10/2008 | Dejong et al. | |
| 2013/0229453 | A1 | 9/2013 | Edwards et al. | |
| 2015/0022588 | A1 | 1/2015 | Rodriguez et al. | |
| 2015/0328911 | A1 | 11/2015 | Garcia Maza et al. | |
| 2016/0114576 | A1 | 4/2016 | Tobita | |
| 2017/0066256 | A1 | 3/2017 | Musete | |
| 2018/0178565 | A1 | 6/2018 | Kato et al. | |
| 2018/0236794 | A1 * | 8/2018 | Mizuno | B41J 25/001 |
| 2019/0118531 | A1 | 4/2019 | Muhl et al. | |

* cited by examiner

*Primary Examiner* — Lam S Nguyen
(74) *Attorney, Agent, or Firm* — Perkins Coie LLP; Colin Fowler

(57) ABSTRACT

Disclosed herein is a technique that enables a carriage printer to reduce precision in a media conveyor by improving mobility of the carriage. The carriage includes a mobile jetplate that adjusts the position of the printheads within the carriage. The mobile jetplate includes multiple motors that enable shifts in an axis matching the axis of the media. Operating the motors of the jetplate at different locations or at different intensities causes the jetplate to skew and achieve mobility of multiple axes. A set of sensors monitor media skew and shifts of the mobile jetplate are able to compensate for that skew. An additional set of motors shift the carriage to compensate for deformation of the beam that the carriage shuttles along.

17 Claims, 12 Drawing Sheets

STEP COMPENSATING CARRIAGE PRINTER

CROSS-REFERENCE TO RELATED APPLICATION(S)

This application is a continuation of U.S. patent application Ser. No. 16/590,233 filed on Oct. 1, 2019, which is incorporated herein by reference in its entirety.

TECHNICAL FIELD

The present disclosure relates to carriage printers, and, more particularly, the present disclosure relates to a adjusting the positioning of a carriage with relation to other components based on detected error in media positioning or component deformation.

BACKGROUND

Carriage printers include a carriage that shuttles along a beam while depositing ink on media. A media conveyor steps the media forward after each deposition of ink by printheads on the carriage. Precision of placement of ink is a key factor in evaluation of the quality of a printing operation. The media in a carriage printer is advanced at speeds of nearly 30 inches per second with a target accuracy of at least 10½ μm. Achieving the target precession at speed is a difficult task.

DETAILED DESCRIPTION OF THE PREFERRED EMBODIMENTS

Figure 1:
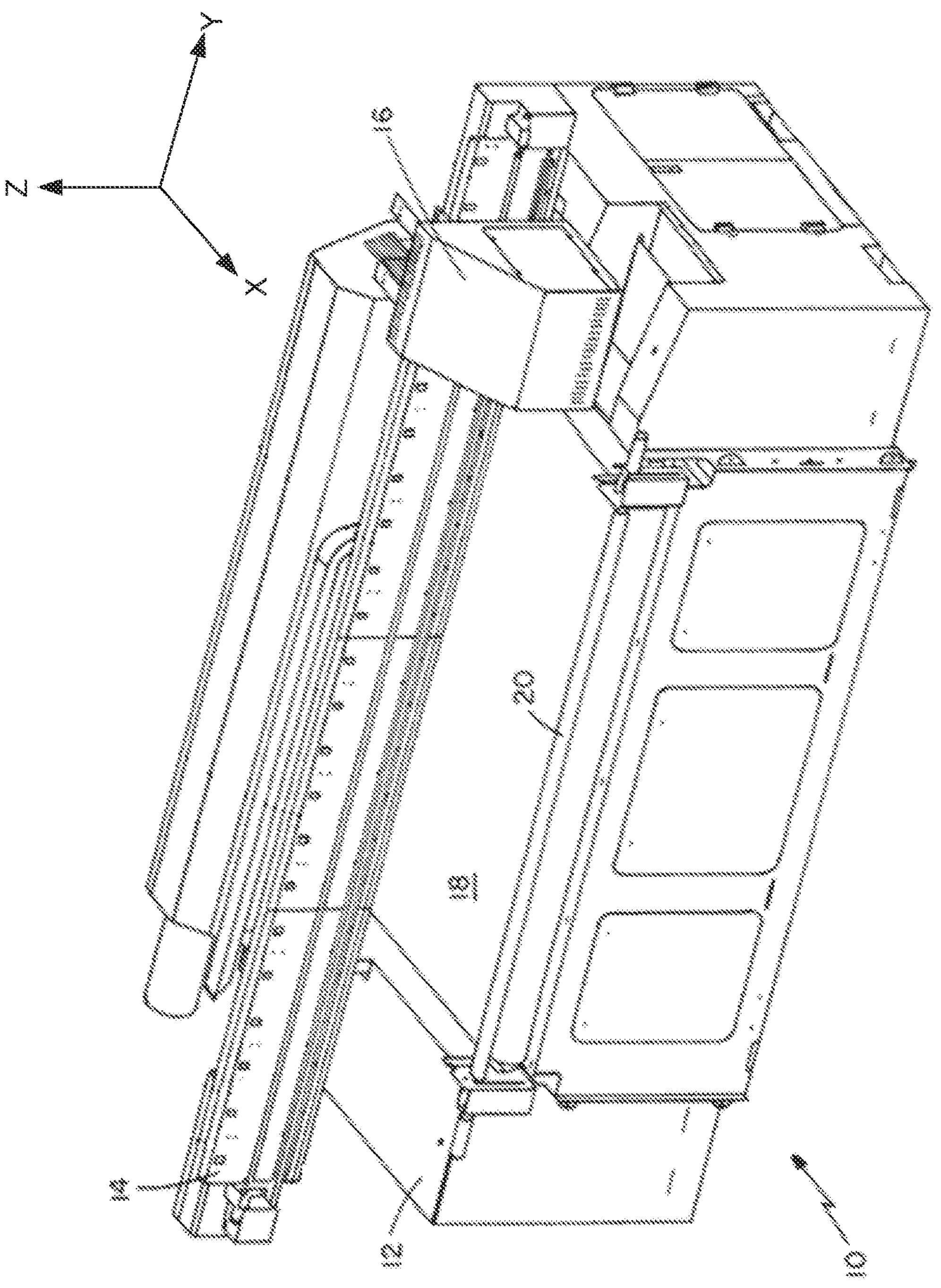
FIG. 1 (Prior Art)
FIG. 1 is an illustration of a prior art printing system 10 that prints on both flexible and non-flexible substrates.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Disclosed herein is a printer with modified precision components. FIG. 1 is an illustration of a prior art printing system 10 that prints on both flexible and non-flexible substrates. Further, the printing system 10 is able to accommodate substrates with various thickness automatically during the printing process.

The printing system 10 includes a base 12, a rail system 14 attached to the base 12, a transport belt 18 which moves a substrate though the system, and a substrate thickness indicator roller 20. A prior art carriage 16 holding a set of print heads (not shown) is supported by and traverses along a beam 14. The transport belt 18 is heavy and includes expensive and powerful precision motors in order to control the positioning of the media.

In order to print at a high quality, the nexus between the positioning of printheads and the media must be very precise. The present disclosure contemplates modifications that reduce the need for precision in the motors of the transport belt/media conveyor. Instead, precision motors and sensors are positioned elsewhere on the printer and on significantly lighter components. The expense of a precision motor tends to be directly related to mass of the element that need be moved with precision.

Figure 2A:
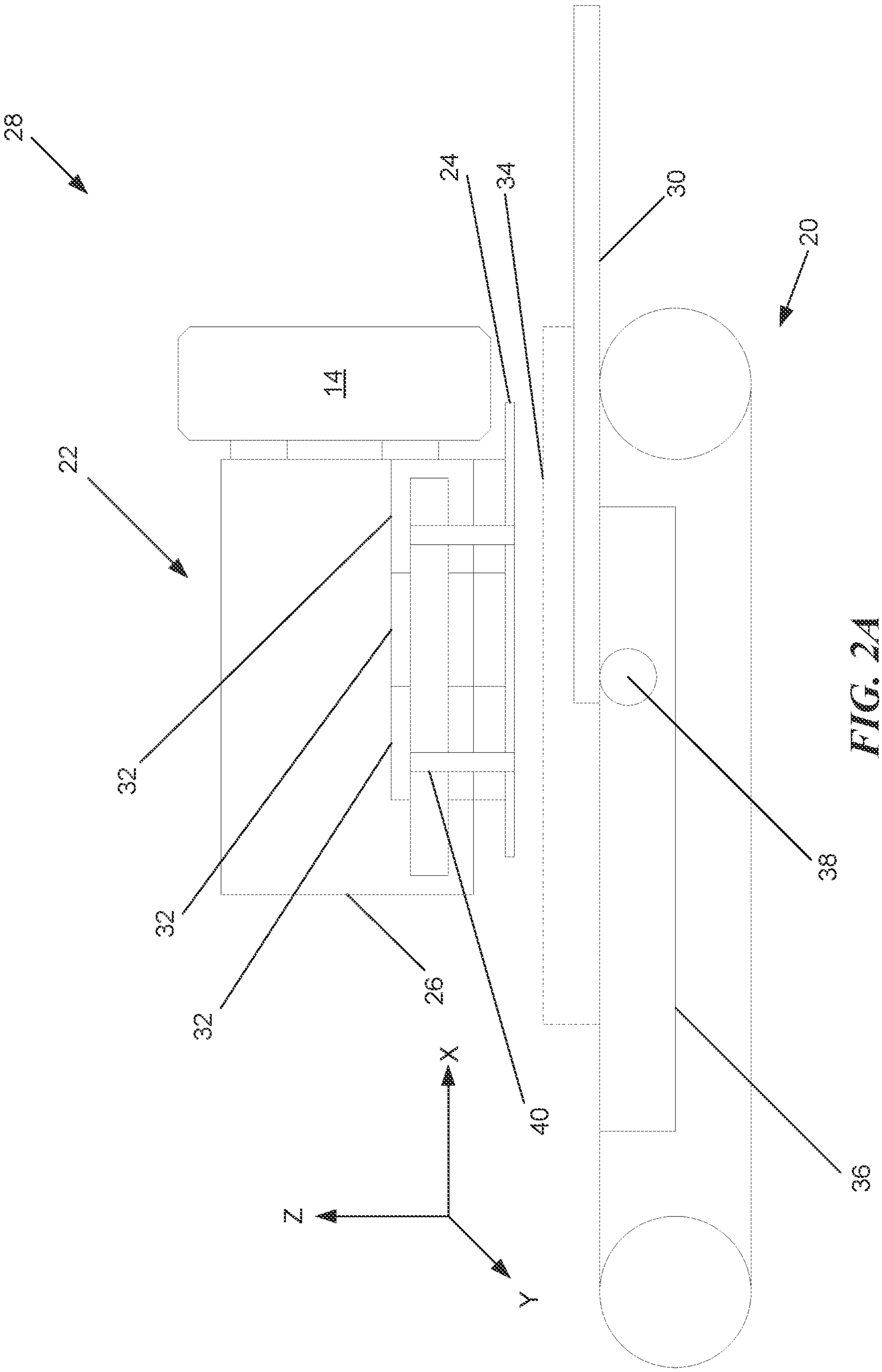
FIG. 2A illustrates an example of a carriage with a mobile jetplate.

FIG. 2A illustrates an example of a carriage 22 with a mobile jetplate 24. The carriage 22 includes a housing 26 that mounts to the beam 14 of the printer 28. The carriage housing 26 is shuttled along the beam in an axis (Y axis) that is perpendicular to the direction of the media 30 is moved (X axis) on the media conveyor 20. The term media conveyor refers to any conveyance for media and does not strictly refer to a conveyor belt style printer. A roll-to-roll conveyance is included as a media conveyor 20.

The carriage 22 includes a set of printheads 32. The printheads 32 are mounted on the mobile jetplate 24. The mobile jetplate 24 is a platform that shifts in position relative to the carriage housing 26 and enables further positioning of the printheads 32. In use, the media conveyor 20 attempts to shift media to an intended position 34 where the printer 28 expects the media 30 to be in order to apply ink as indicated by print instructions. However, the media conveyor 20 and the media 30 can be rather heavy and ensuring precision of positioning requires expensive components.

On many high-end printers, the media 30 is advanced at speeds of nearly 30 ips (4.9" in ⅙s) with a target accuracy of at least 10½ μm (½ pixel at 1200 DPI). These printers use rigid structural components, dual encoder systems and high-end electronics to move the conveyer 20. The precision of the ink placement is on the order of within 10 microns. Conversely the printer components are moving comparatively very large distances (e.g., five-inch steps in a fraction of a second). One of the biggest difficulties in the motion is moving that media 30. One means to draw the media 30 down is with a conveyor vacuum 36. If the vacuum 36 operates at as low as a half a PSI, there are hundreds of pounds of force in the belt tension that need to be overcome when the media is stepped forward. Overcoming that scale of force on the micron level is not a small feat.

Construction of the printer 28 is easier with components that allow and account for a degree of error. Where the media conveyor 20 includes error, the mobile jetplate 24 corrects for that error. To measure the error, the media conveyor 20 includes a conveyor sensor 38, such as an encoder. Examples of conveyor sensors 38 include both rotary encoders and loop encoders. Alternatively, a vision sensor can analyze fiducial markers or coloring in the weave on the belt of the conveyor 20. In some embodiments, an array of optical mouse sensors can be installed across the print width. To improve accuracy of the conveyor sensor 38 with respect to the actual position of the media 30, a conveyor vacuum 36 adheres the media 30 to the belt of the media conveyor 20.

The mobile jetplate 24 and printheads 32 are adjustable relative to the carriage housing 26 and mounted on linear slides that allow precision movement in at least the X axis. The mobile jetplate 24 includes a slider sensor 40 that precisely measures the movement of the mobile jetplate 24 in order to enable precision of placement. The slider sensor 40 may use magnetic, optical or laser sensing in a device such as an encoder.

Precision placement of the mobile jetplate 24 is an easier task than precision positioning of the media 30 through use of the media conveyor 20 because the mobile jetplate 24 uses comparatively rigid components (e.g., metal sliders as opposed to a flexible belt) and weighs significantly less than the combination of the belt and the media 30. Further, different materials used as media 30 have different physical properties and cause additional variability in positioning. Positioning of the carriage 22 is more predictable than the media 30.

Figure 2B:
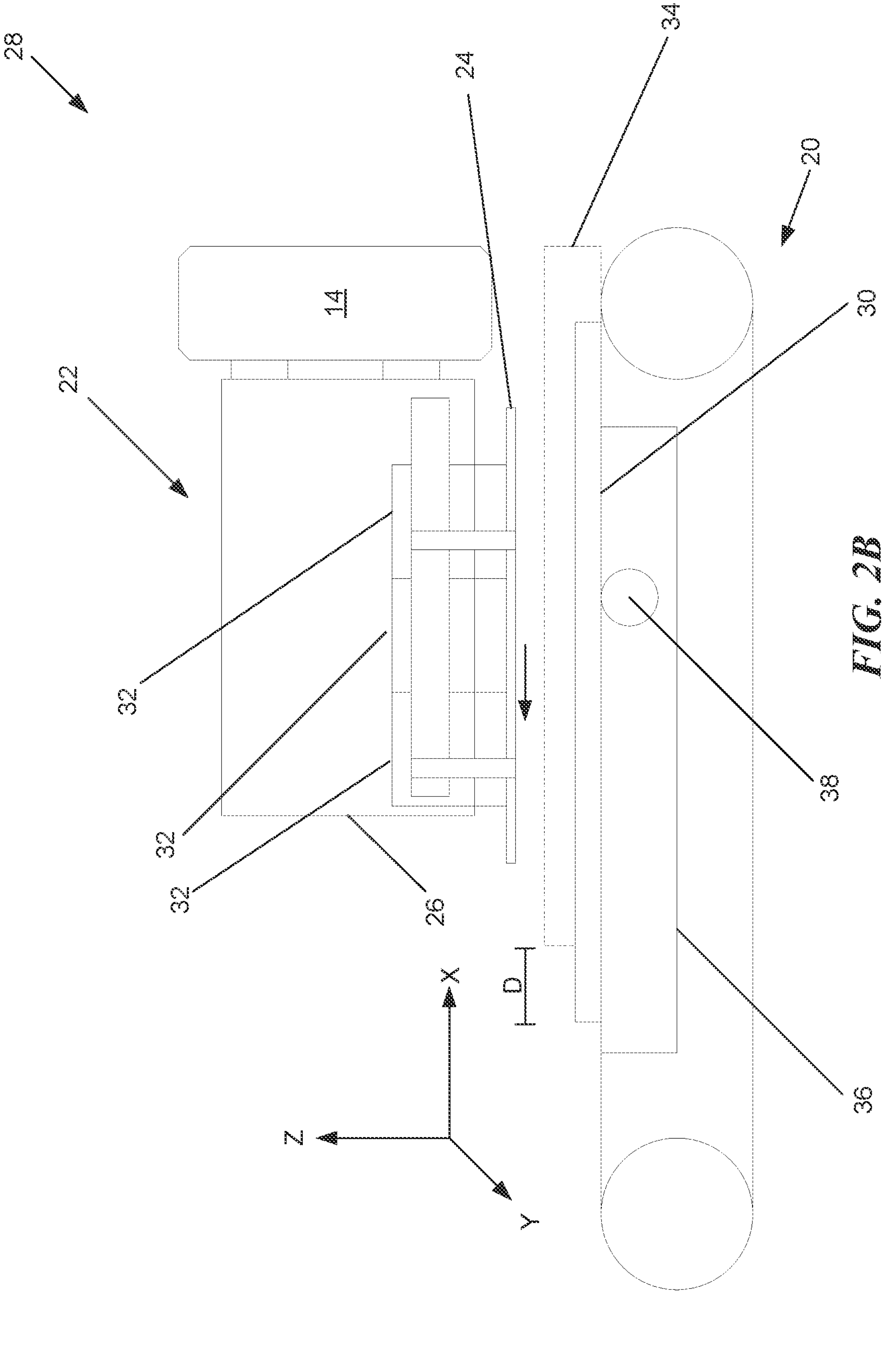
FIG. 2B illustrates positioning of the mobile jetplate.

FIG. 2B illustrates positioning of the mobile jetplate 24. In the figure, the media conveyor 20 has moved the media 30 a step. The position of the media 30 has overshot the intended position of the media 34 by distance "D." In response, the mobile jetplate 24 has shifted forward in the X axis by distance "D" to compensate for the error of the media conveyor 20.

Figure 3:
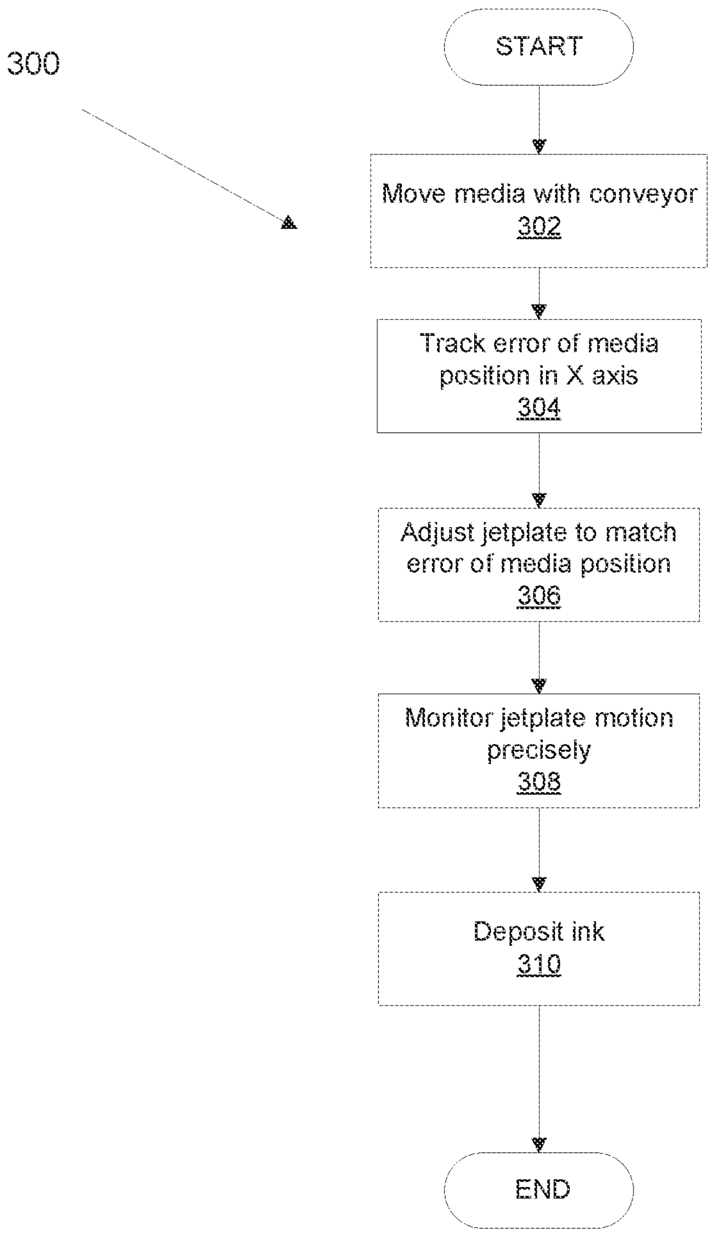
FIG. 3 is a flowchart illustrating a method of operating a carriage with a mobile jetplate.

FIG. 3 is a flowchart illustrating a method of operating a carriage with a mobile jetplate. In step 302, media is moved a step by the media conveyor. In step 304, the conveyor sensor tracks the position of the media in the X axis. The printer has an expected position for the media (relative to the printheads) at each step in the print instructions and during step 304, the printer determines an error from that expected position using the measurements from the conveyor sensor. The error detected by the conveyor sensor is in the axis of the media conveyor (X axis). In some embodiments, the determination of the error may be calculated while the media is being moved (e.g., simultaneously with step 302).

In step 306, the printer adjusts the mobile jetplate to compensate for the error determined in step 304. The adjustment of the mobile jetplate may occur simultaneously or after the completion of step 304. If the adjustment occurs after the calculated error is determined, the mobile jetplate may be moved directly into place. Conversely, if the adjustment is made while the error is being calculated and while the media is being moved, the mobile jetplate may be "dialed-in" to the correct position that compensates for error with a servoing movement.

Where the adjustment through servoing takes place along with the movement of the media and calculation of error, the mobile jetplate will often overshoot the final position of the media and then have to adjust in the opposite direction. Based on prior movements and/or an observed acceleration/deceleration of the media via the conveyor sensor (or other available sensors), the printer can estimate where the mobile jetplate will need to adjust. This estimation will also have a degree of error and require correction.

In step 308, the adjustment of the jetplate is monitored precisely with a slider sensor. The jetplate motion is monitored to ensure precise placement. In some embodiments, the jetplate is monitored to a one-micron level of accuracy. In step 310, the printheads deposit ink.

Figure 4A:
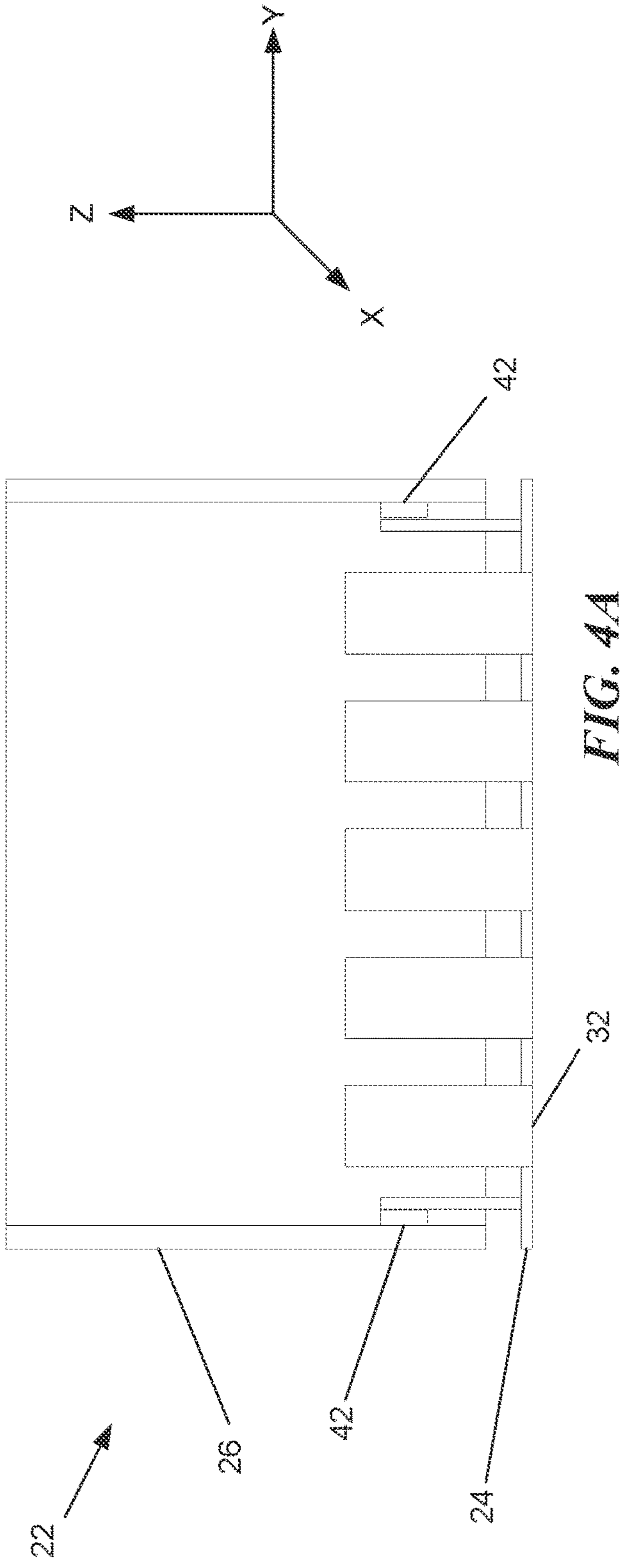
FIG. 4A illustrates a front view of a carriage with multiple jetplate motors.

FIG. 4A illustrates a front view of a carriage 22 with multiple jetplate motors 42. Jetplate motors 42 are embodied in a number of configurations. In some embodiments, the jetplate motor 42 is a linear motor, a lead screw or a piezo motor. Optionally, the jetplate motor 42 is precise to one micron. A track that the jetplate moves along is restricted to movement in only the X axis (parallel with the media motion of the media conveyor). In some embodiments, there is only a single jetplate motor 42.

Figure 4B:
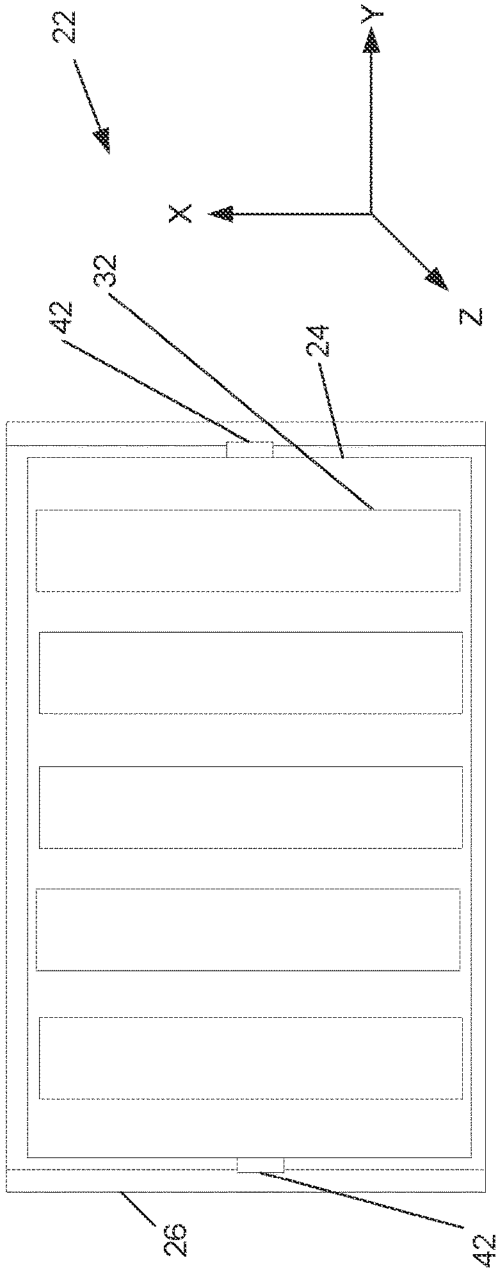
FIG. 4B illustrates a top view of a carriage with multiple jetplate motors.

FIG. 4B illustrates a top view of a carriage with multiple jetplate motors. Despite the restriction in movement to the X axis, machining of parts and engineering tolerance in the track that the jetplate 24 moves in enables some skew. Where there are at least two jetplate motors 42, and those motors are run in reverse of one another, or at varied distances in the same direction, the tolerance of the path the jetplate 24 moves along enables the jetplate 24 to rotate about the vertical, Z axis (e.g., similar to the manner tank treads enable yaw-rotation).

In some embodiments, the jetplate 24 can be mounted on pivots that are mounted on the X axis slides to allow rotation about the Z axis. Flexures connecting the jetplate 24 to the slides also enable Z axis rotation.

Figure 5:
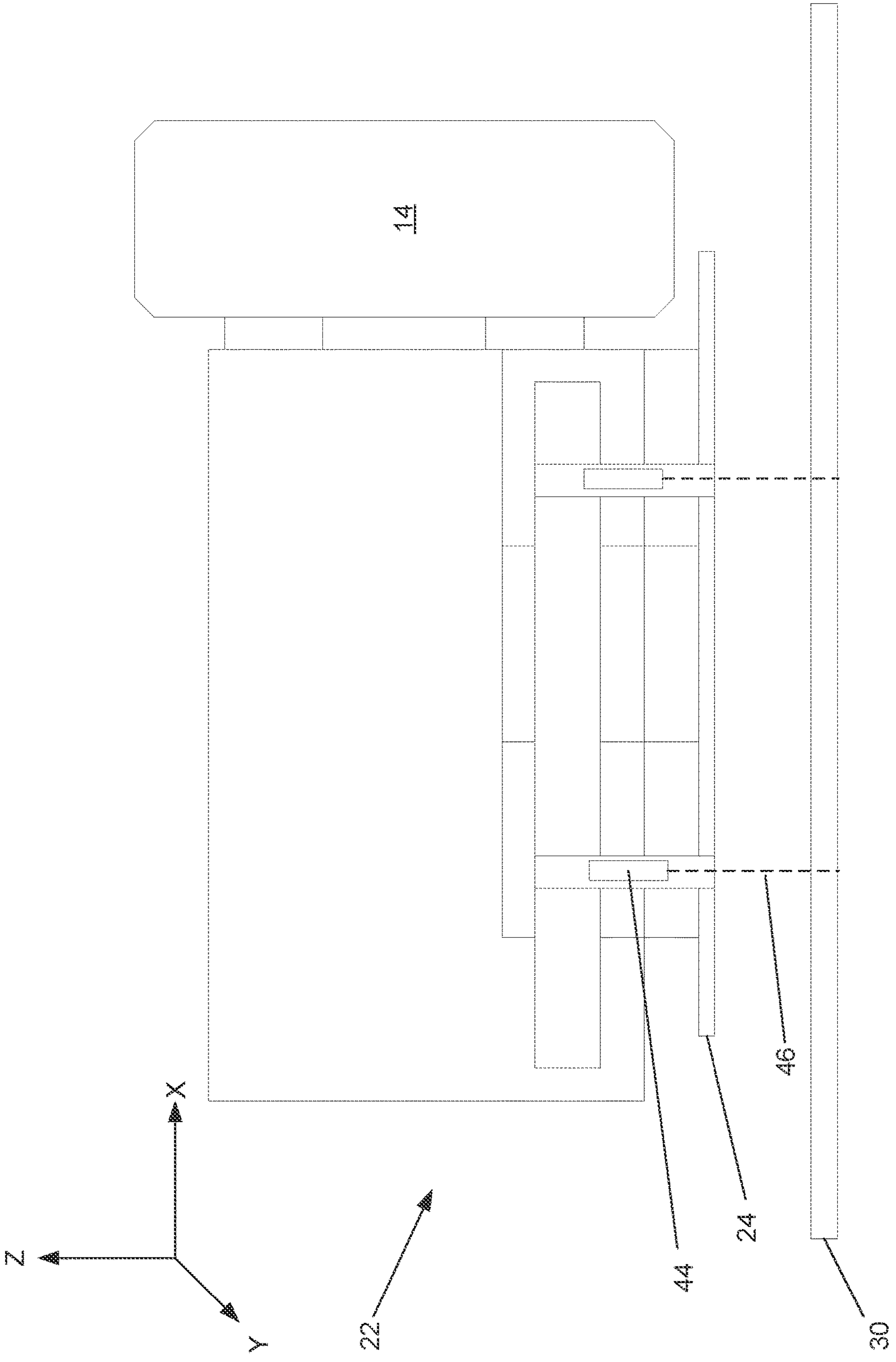
FIG. 5 illustrates a set of skew sensors mounted on the carriage.

FIG. 5 illustrates a set of skew sensors 44 mounted on the carriage 22. In some embodiments skew sensors 44 are mounted on the carriage 22 and face downwards. The skew sensors 44 measure skew in the media 30. When the carriage 22 reaches either edge of the beam 14 upon which the carriage 22 shuttles, the skew sensors 44 identify a location for the edge of the media 30. Where the skew sensors 44 are mounted at positioned varied in the X axis, differences in the detected edges of the media 30 between each skew sensor 44 enable the printer to determine a skew angle the media 30 oriented at.

In some embodiments, the jetplate 24 uses multiple layers of jetplate motors 42. For example, one layer of motors 42 enable movement in only the X axis, whereas a second layer of motors enable movement rotating around the Z axis. In some embodiments, the jetplate 24 structure resembles a dial (rotates about Z) that is mounted on rails (linear shifts in X).

Figure 6A:
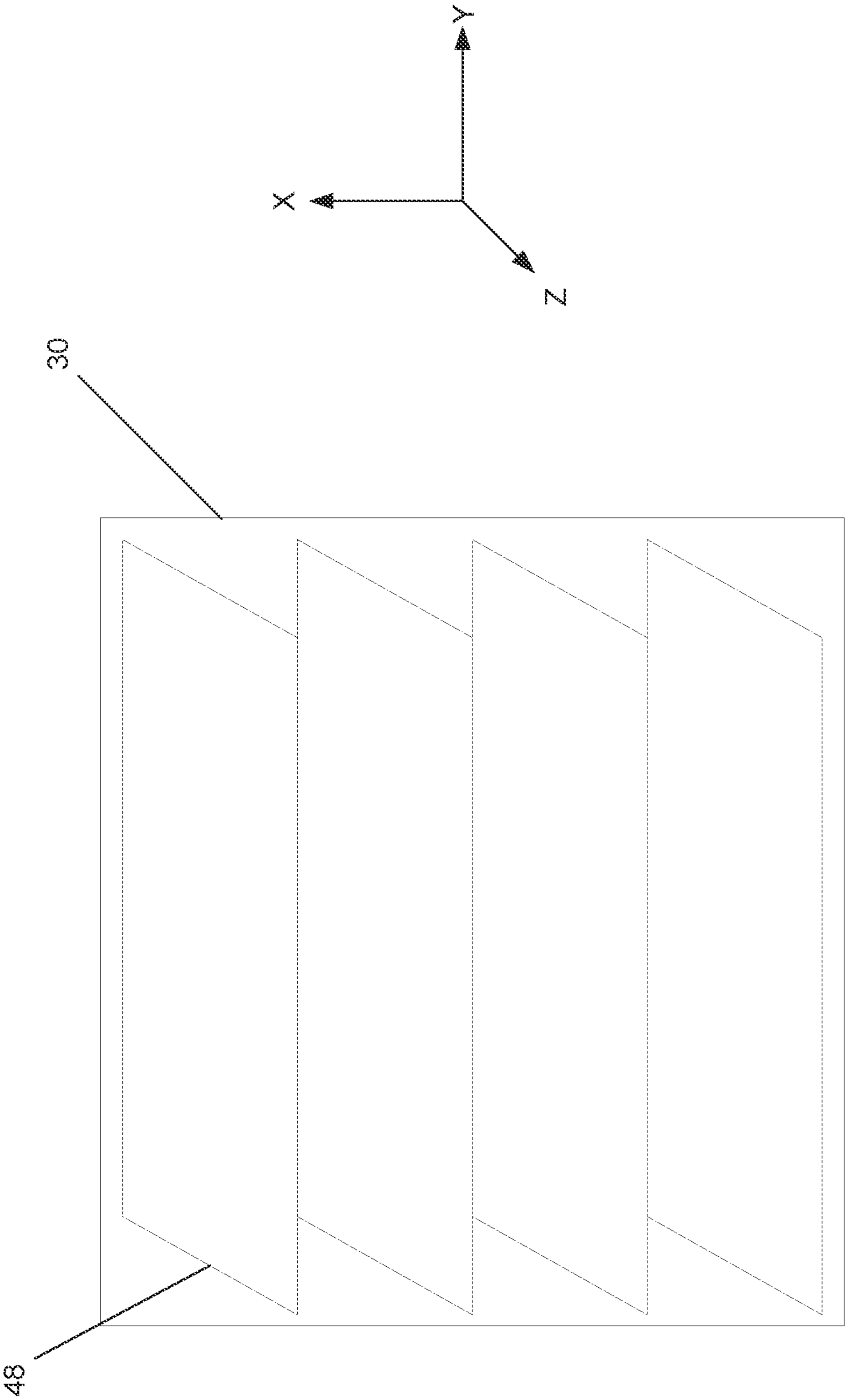
FIG. 6A illustrates the result of printhead or carriage skew on non-skewed media.

FIG. 6A illustrates the result of printhead or carriage skew on non-skewed media. FIG. 6A is an exaggerated view for the purposes of illustration demonstrating a jagged result. Where there is printhead skew, if there is no correction in the positioning of the printheads 32, then the placement of the ink 48 will also be similarly skewed. By rotating the carriage 22 or jetplate 24 to compensate for the skew error, then the resultant print job will instead have a color plane error (e.g., caused as a result that printheads positioned on either side of the carriage 22 will be oriented differently). However, color plane error is far more acceptable to users than jagged edges.

The color plane error can be corrected by skewing the jetplate 24 to align perpendicular to the media edge, but it requires the jetplate 24 to be moved as it transitions across the media to maintain a perpendicular line of travel to the media edge. There are limits in practice, but correction of the color plane error is directly related to the amount of carriage motion allowed in the X axis.

Figure 6B:
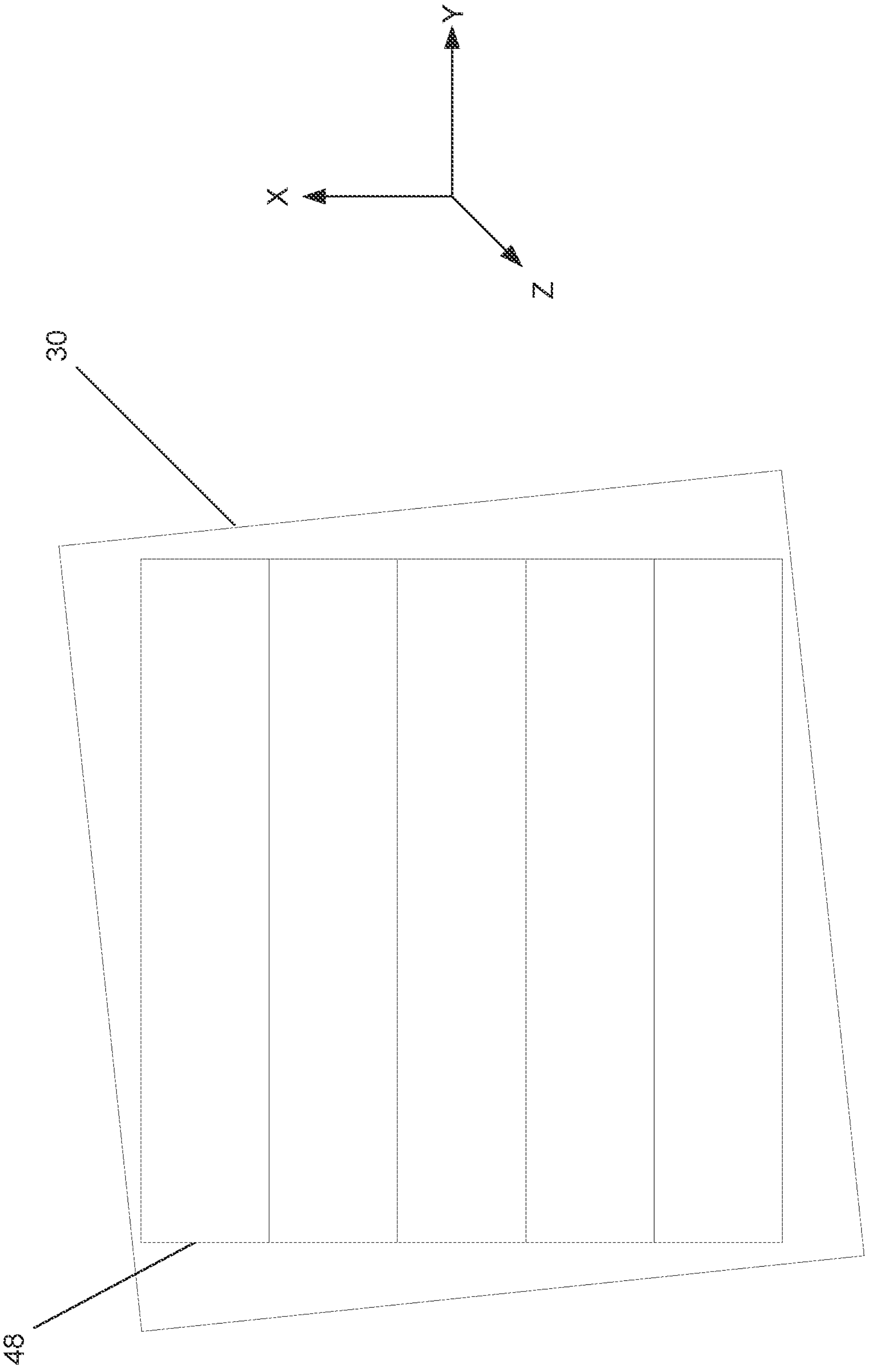
FIG. 6B illustrates the result of media skew on a print job.

FIG. 6B illustrates the result of media skew on non-skewed media. Where the media 30 runs through the printer 28 at an angle (skewed), the placement of the ink 48 will be correspondingly rotated. The issue of media skew may be similarly fixed through carriage correction.

Figure 7:
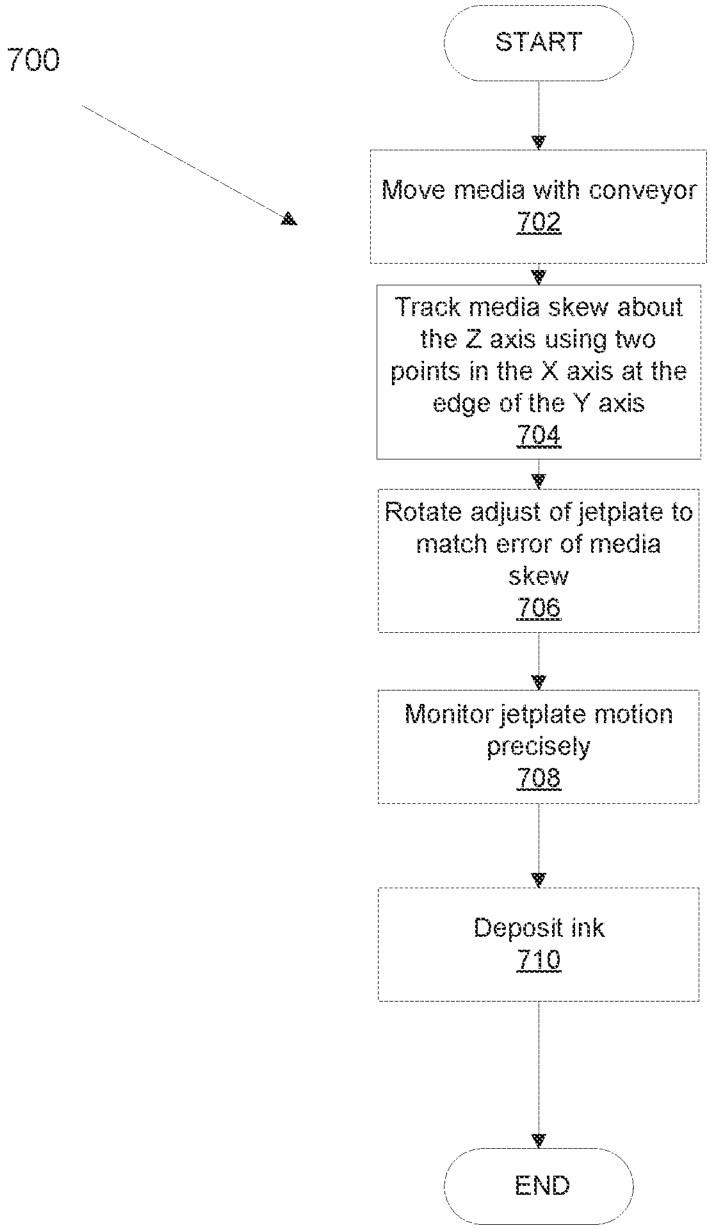
FIG. 7 is a flowchart that illustrates a process for compensating for media skew.

FIG. 7 is a flowchart that illustrates a process for compensating for media skew. In step 702, media is moved a step by the media conveyor. In step 704, the printer determines media skew as defined as rotation about the Z axis. Media skew is determined by using at least two points that vary in the X axis at the edges of the media ("edges of the media" in the Y axis). In step 706, the jetplate is rotated. In step 708, the adjustment of the jetplate is monitored precisely. The jetplate motion is monitored to ensure precise placement. In some embodiments, the jetplate is monitored to a one-micron level of accuracy. In step 710, ink is deposited.

Figure 8:
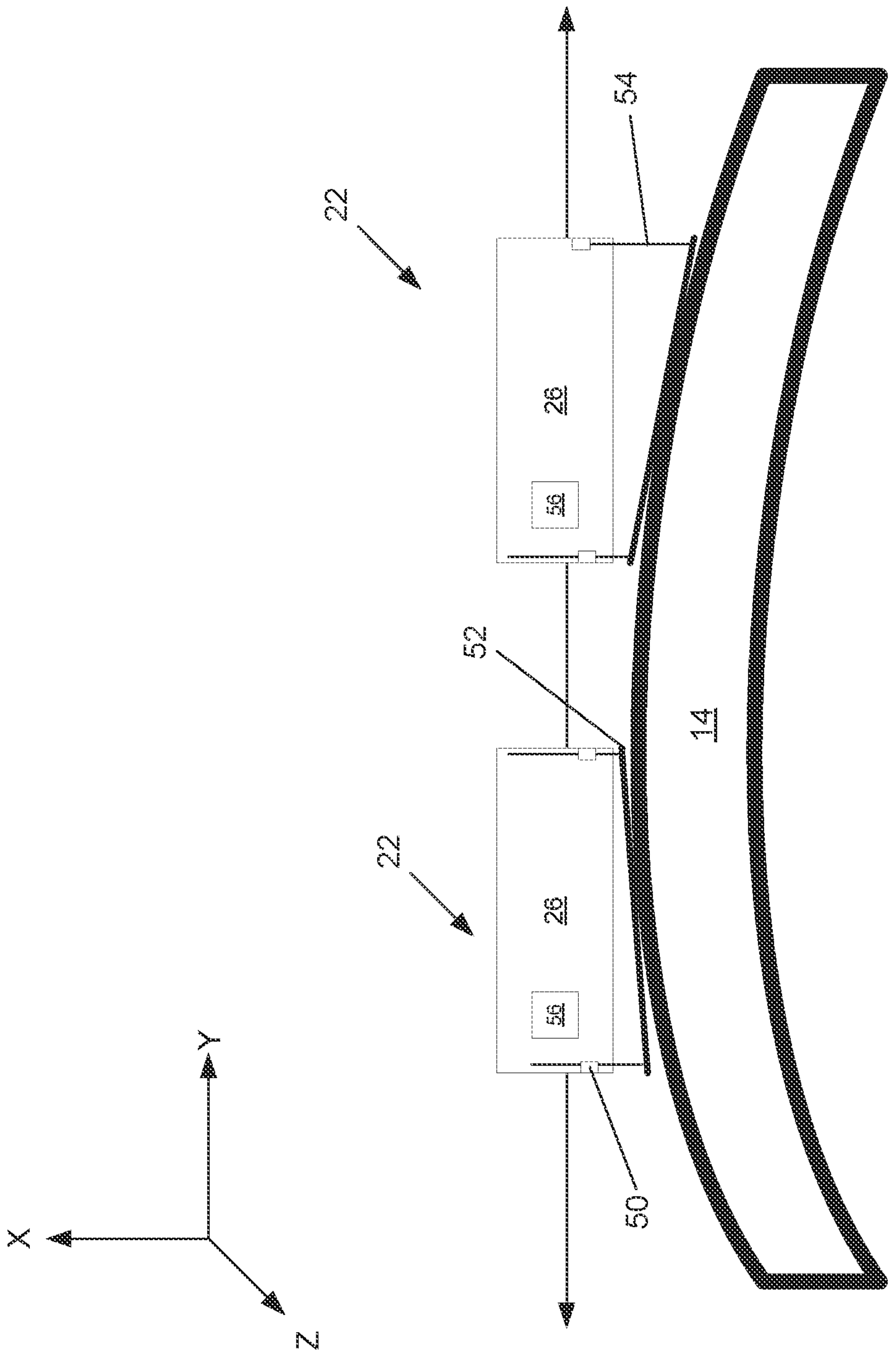
FIG. 8 illustrates an adjustable carriage that compensates for beam deformation.

FIG. 8 illustrates an adjustable carriage that compensates for beam deformation. While in operation, printers generate an appreciable amount of heat. The heat causes components to expand in unpredictable ways and induce an additional source of error. FIG. 8 is an exaggerated depiction of the beam 14 warping in response to heat. As the carriage 22 shuttles along the beam 14, where the beam 14 is deformed, the carriage 22 will be incorrectly positioned.

In order to adjust in response to component deformation, the carriage housing 26 includes additional adjustment motors 50 that enable adjustment of the carriage 22 angle with respect to the beam 14. A beam guide component 52 continues to shuttle along the beam 14, while the adjustment motors 50 positioned on either side of the carriage housing 26 enable the carriage housing 26 to pivot outward on struts 54.

An angular sensor 56 is used to determine whether the shuttling of the carriage 22 deviates from the Y axis. Examples of potential angular sensors 56 are accelerometers, gyroscopes, inertial measurement units (IMU) or magnetic trackers. The angular sensor 56 detects deviations from the Y axis, and the printer 28 instructs the adjustment motors 50 to extend a strut 54 to compensate for the beam deformation.

Figure 9:
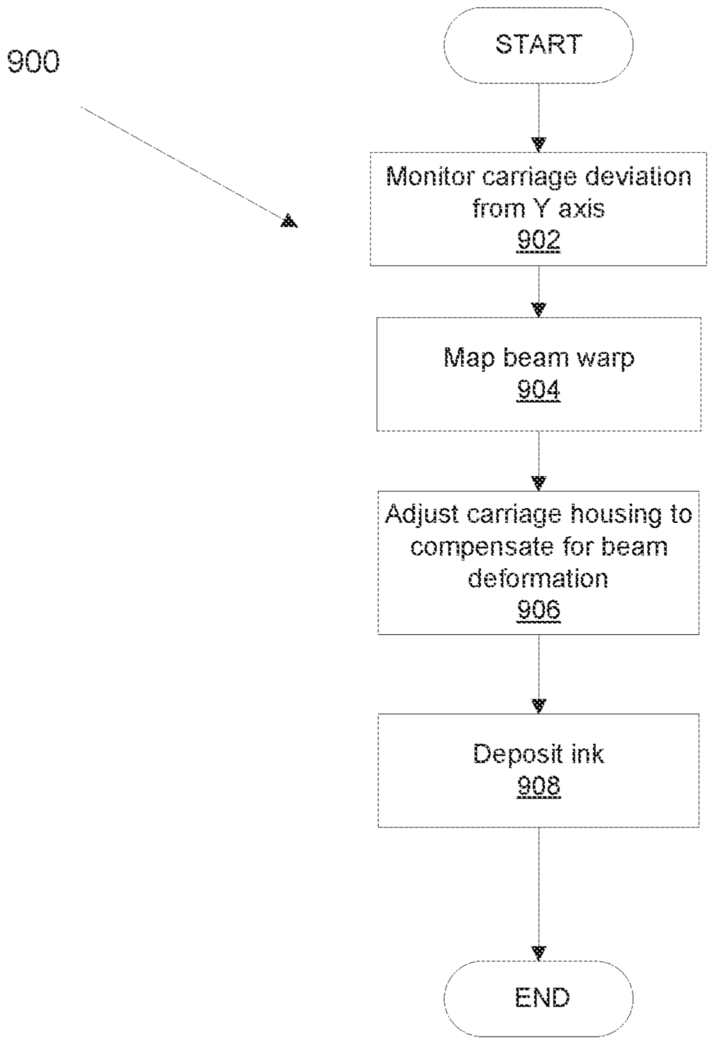
FIG. 9 is a flowchart that illustrates a process for compensating for beam deformation.

FIG. 9 is a flowchart that illustrates a process for compensating for beam deformation. In step 902, the printer monitors the carriage for deviation from the Y axis. Monitoring is performed by an angular sensor. As the carriage shuttles back and forth, deviations are recognized. In step 904, the printer maps the warping of the beam. If a deviation is detected, that deviation will persist at least until the printer is allowed to cool down. The deviation may continue to change during operation and thus the map of the beam deviation is a continuous operation.

In step 906, the carriage's position relative to the beam is adjusted as the carriage shuttles across the beam and deposits ink. The printer causes the carriage to adjust according to the beam deformation. The adjustments happen quickly and during the shuttling action of the carriage to smoothly deposit ink on a given pass of the carriage. In step 908, the printer deposits the ink.

Figure 10A:
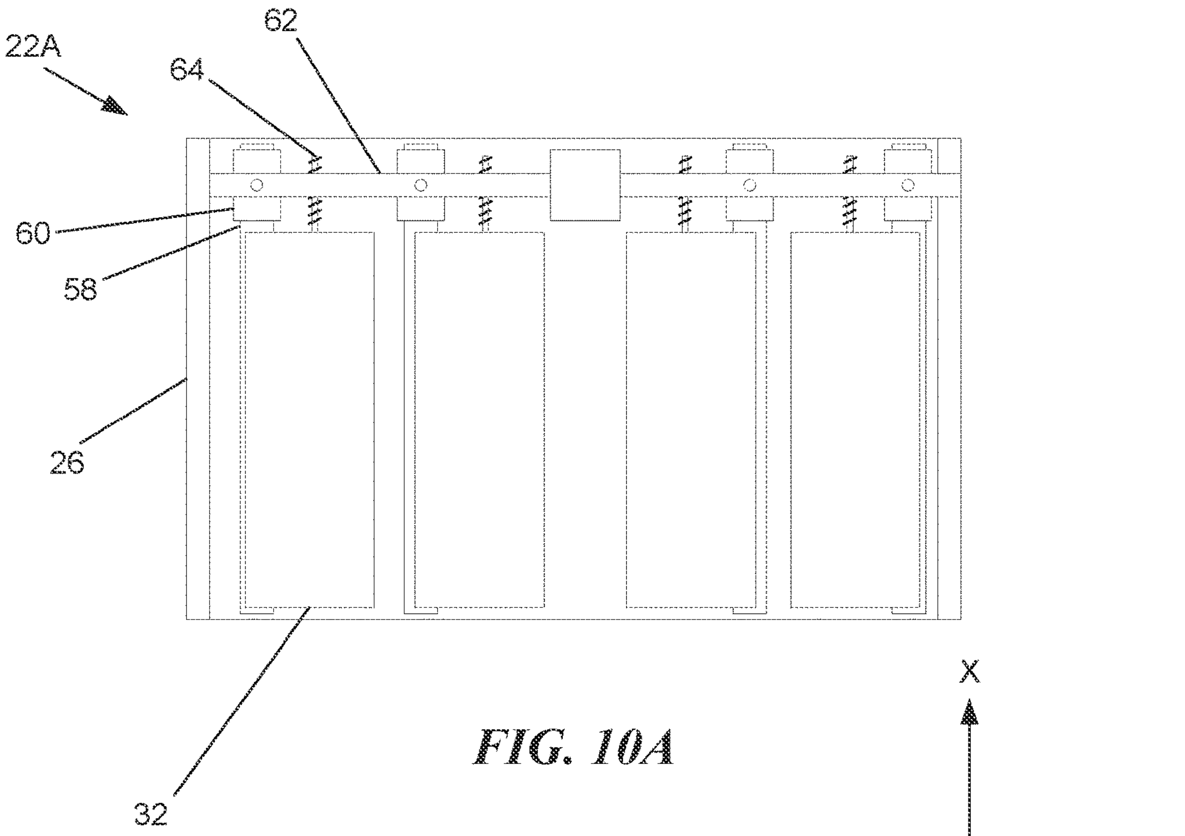
FIG. 10A illustrates a first embodiment of multiple mobile jetplates configured for each printhead.

FIG. 10A illustrates a first embodiment 22A of multiple mobile jetplates configured for each printhead 32. In the first embodiment 22A, each printhead 32 is mounted on a rail 58 that slides through a bearing 60 mounted on a fixed rail 62. A lead screw 64 is depicted as providing the means to shift the printhead 32 (along with the rail 58) back and forth in the X axis.

Figure 10B:
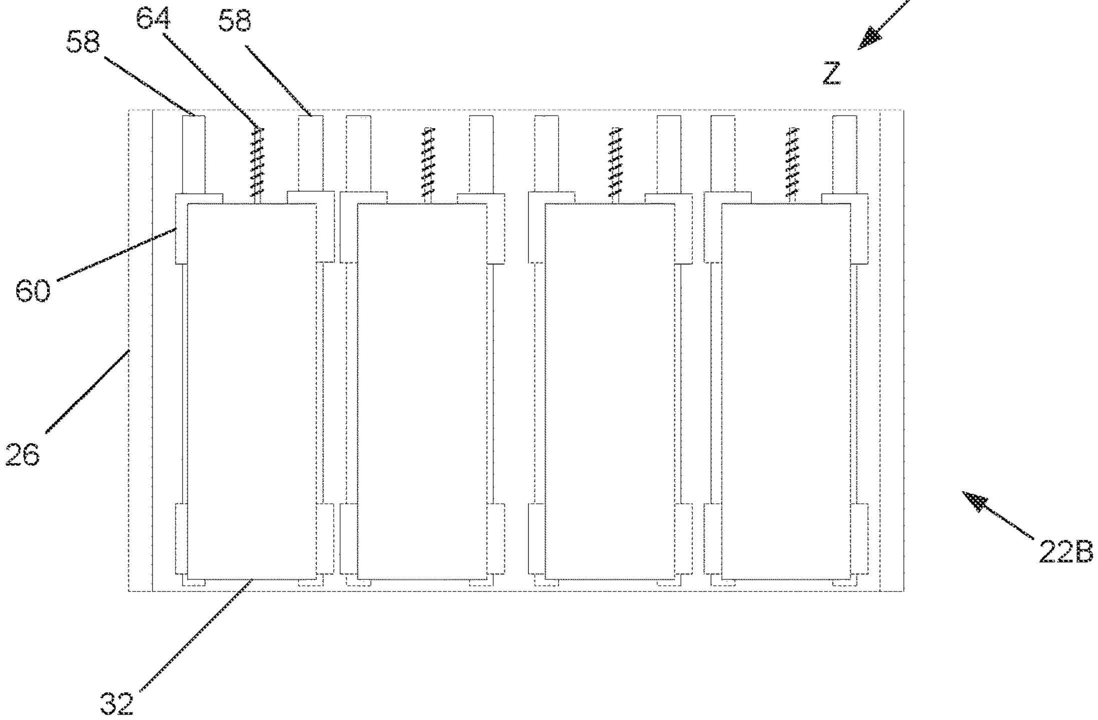
FIG. 10B illustrates a second embodiment of multiple mobile jetplates configured for each printhead.

FIG. 10B illustrates a second embodiment 22B of multiple mobile jetplates configured for each printhead 32. In the second embodiment 22B, each print head is mounted on a set of bearings 60 that slide along rails 58 via use of a lead screw 64.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples: alternative implementations may employ differing values or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents, applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶ 6, other aspects may likewise be embodied as a means-plus-function claim, or in other forms, such as being embodied in a computer-readable medium. (Any claims intended to be treated under 35 U.S.C. § 112, ¶ 6 will begin with the words "means for"). Accordingly, the applicant reserves the right to add additional claims after filing the application to pursue such additional claim forms for other aspects of the disclosure.

Accordingly, although exemplary embodiments have been shown and described, it is to be understood that all the terms used herein are descriptive rather than limiting, and that many changes, modifications, and substitutions may be made by one having ordinary skill in the art without departing from the spirit and scope of the invention.

The invention claimed is:

1. A printer apparatus comprising:

a media conveyor that advances media through the printer apparatus and is configured to move a belt to a target position of media advancement;

a beam oriented perpendicularly to a direction of media movement of the media conveyor comprising a carriage shuttling path;

an accelerometer mounted to a carriage configured to detect deformation in the carriage shuttling path associated with heat expansion of the beam; and the carriage mounted to the beam via a carriage frame, the carriage frame configured to shuttle along the beam via the carriage shuttling path, the carriage further including an inkjet mounted on a jetplate, wherein the jetplate is configured to reposition the inkjet relative to the carriage frame in both a cam rotational movement direction to the beam and parallel to the direction of media movement corresponding to deformation in the carriage shuttling path based on an indication of the accelerometer.

2. The printer apparatus of claim 1, further comprising:

a first motion sensor mounted to the carriage and configured to precisely monitor an amount of movement of the jetplate.

3. The printer apparatus of claim 2, wherein the jetplate is configured to adjust position in compensation for a positioning error of a media workpiece based on indications of the first motion sensor.

4. The printer apparatus of claim 2, wherein the first motion sensor is any of:

rotary encoders;

optical sensors; or accelerometers.

5. The printer apparatus of claim 1, further comprising:

sensors mounted to the carriage configured to measure media skew in degrees from the direction of media movement.

6. The printer apparatus of claim 1, further comprising:

at least two linear adjusters associated with repositioning of the jetplate and positioned on opposite sides of the jetplate.

7. The printer apparatus of claim 6, wherein the at least two linear adjusters are any of:

a linear motor;

a lead screw; and a piezo motor.

8. The printer apparatus of claim 6, wherein the at least two linear adjusters are positioned offset from one another and operation of the at least two linear adjusters in tandem causes the jetplate to rotate.

9. A method of operating a printer apparatus comprising:

advancing, via conveyor motors, a media conveyor in a direction of media movement;

detecting, by an accelerometer mounted to a carriage, deformation in a carriage shuttling path associated with heat expansion of a beam that has a corresponding carriage positioning error associated with the deformation;

shuttling an ink carriage back and forth along a beam oriented perpendicularly to the direction of media movement of a media conveyor; and repositioning an inkjet relative to an ink carriage frame of the ink carriage in both a cam rotational movement direction perpendicular to the beam and parallel to the direction of media movement via a jetplate adjustably mounted to the ink carriage frame, wherein the inkjet is mounted on the jetplate, and the repositioning corresponds to deformation in the carriage shuttling path based on an indication of the accelerometer.

10. The method of operating the printer apparatus of claim 9, further comprising:

precisely monitoring an amount of movement of the jetplate via a first motion sensor mounted to the ink carriage.

11. The method of operating the printer apparatus of claim 10, wherein the jetplate is configured to adjust position in compensation for a positioning error of a media workpiece based on indications of the first motion sensor.

12. The method of operating the printer apparatus of claim 9, further comprising:

measuring media skew in degrees from the direction of media movement via sensors mounted to the ink carriage.

13. The method of operating the printer apparatus of claim 9, further comprising:

rotating the jetplate via operation of at least two linear adjusters in tandem, wherein the at least two linear adjusters are positioned offset from one another and on opposite sides of the jetplate.

14. A system comprising:

a media conveyor;

an inkjet carriage configured to move laterally with respect to a media conveyor path, the inkjet carriage including an accelerometer configured to detect deformation in a carriage shuttling path associated with heat expansion of a beam that the inkjet carriage travels along; and an inkjet mounted within the inkjet carriage and configured to adjust position within the inkjet carriage in both a cam rotational movement direction and a direction consistent with the media conveyor path, wherein adjustment of the inkjet is monitored by a second sensor included in the inkjet carriage, wherein adjustment of the inkjet corresponds to deformation in the carriage shuttling path based on an indication of the accelerometer.

15. The system of claim 14, wherein the second sensor is any of:

rotary encoders;

optical sensors; or accelerometers.

16. The system of claim 14, further comprising:

sensors mounted to the inkjet carriage configured to measure media skew in degrees from the media conveyor path.

17. The system of claim 14, wherein the inkjet includes a first color print head and a second color print head, and wherein adjustment of the first color print head is independent from adjustment of the second color print head.

* * * * *